W. H. KELLER.
MATHEMATICAL GEOGRAPHY ILLUSTRATOR.
APPLICATION FILED JULY 25, 1908.

926,064.

Patented June 22, 1909.

2 SHEETS—SHEET 1.

WITNESSES:
John T. Schrott
Charles H. Wagner

INVENTOR
W. H. Keller.
BY
Fred G. Dieterich
ATTORNEYS

W. H. KELLER.
MATHEMATICAL GEOGRAPHY ILLUSTRATOR.
APPLICATION FILED JULY 25, 1908.

926,064.

Patented June 22, 1909.

4 SHEETS—SHEET 2.

WITNESSES:
John T. Schrott
Charles H. Wagner

INVENTOR
W. H. Keller.
BY
Fred G. Dieterich
ATTORNEYS.

W. H. KELLER.
MATHEMATICAL GEOGRAPHY ILLUSTRATOR.
APPLICATION FILED JULY 25, 1908.
926,064. Patented June 22, 1909.
4 SHEETS—SHEET 4.
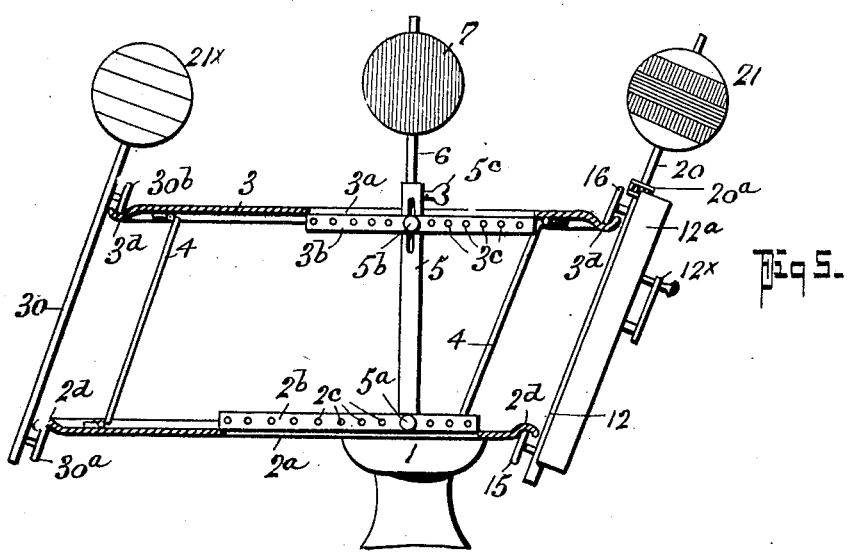
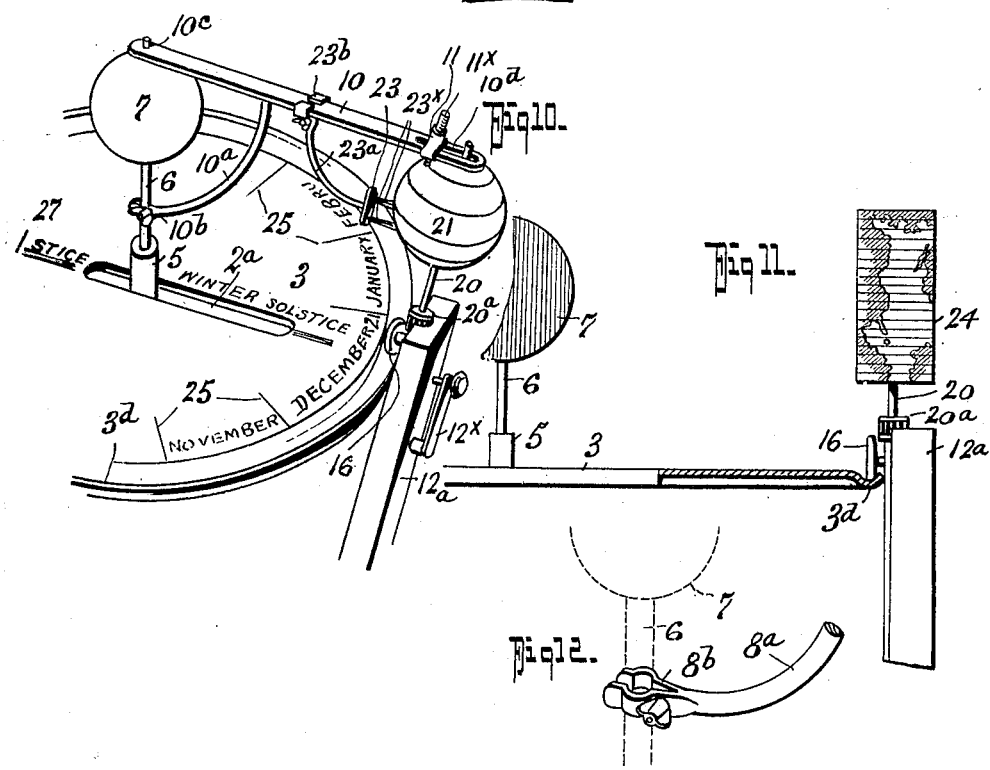
WITNESSES:
John T. Schrott
Charles H. Wagner
INVENTOR
W. H. Keller.
BY
Fred G. Dieterich & Co.
ATTORNEYS

UNITED STATES PATENT OFFICE.

WILLIE H. KELLER, OF ROCKFORD, WASHINGTON.

MATHEMATICAL GEOGRAPHY-ILLUSTRATOR.

No. 926,064.  Specification of Letters Patent.  Patented June 22, 1909.

Application filed July 25, 1908. Serial No. 445,425.

*To all whom it may concern:*

Be it known that I, WILLIE H. KELLER, residing at Rockford, in the county of Spokane and State of Washington, have invented a certain new and useful Mathematical Geography-Illustrator, of which the following is a specification.

My invention has for its object to provide a device for teaching geography and the relation of celestial bodies, and in its generic nature, the invention comprises a support having a pair of horizontal plates spaced apart and mounted on the support, the plates being adjustable in their planes, a central globe supported above the upper plate, and a rotatable globe mounted on a propelling mechanism which runs around a trackway of the plates to encircle the central globe. Other globes are provided to represent certain planets and satellites, and means are also provided for marking the zones on a globe.

More specifically, my invention includes those novel details of construction, combination and arrangement of parts, all of which will be first described, and then be specifically pointed out in the appended claims, reference being had to the accompanying drawings, in which,—

Figure 1:
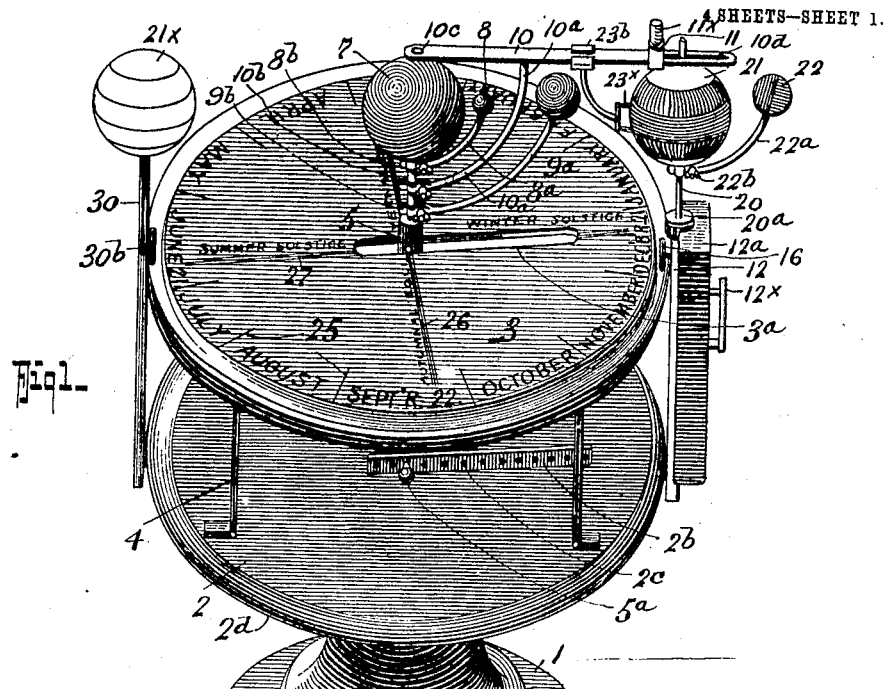
Figure 2:
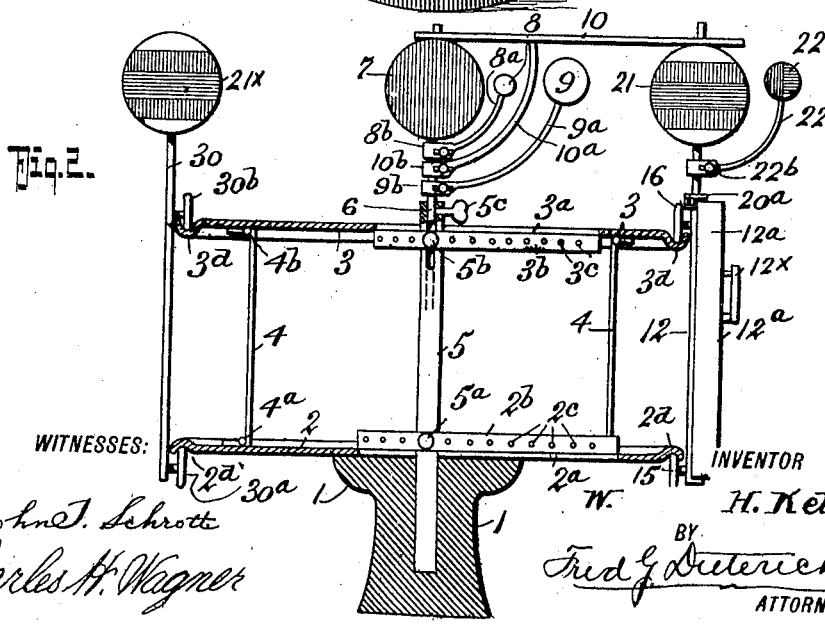
Figure 3:
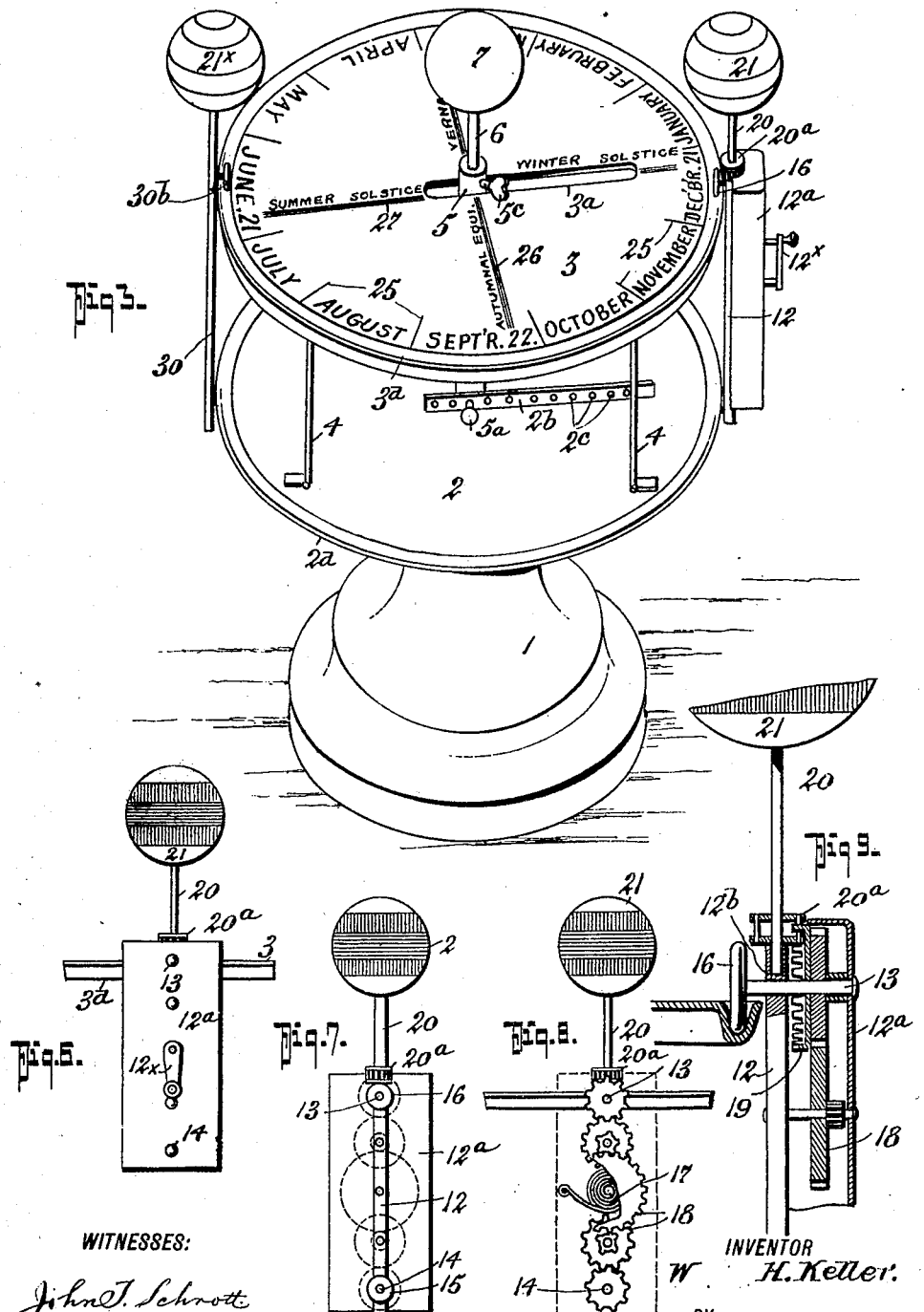
Figure 4:
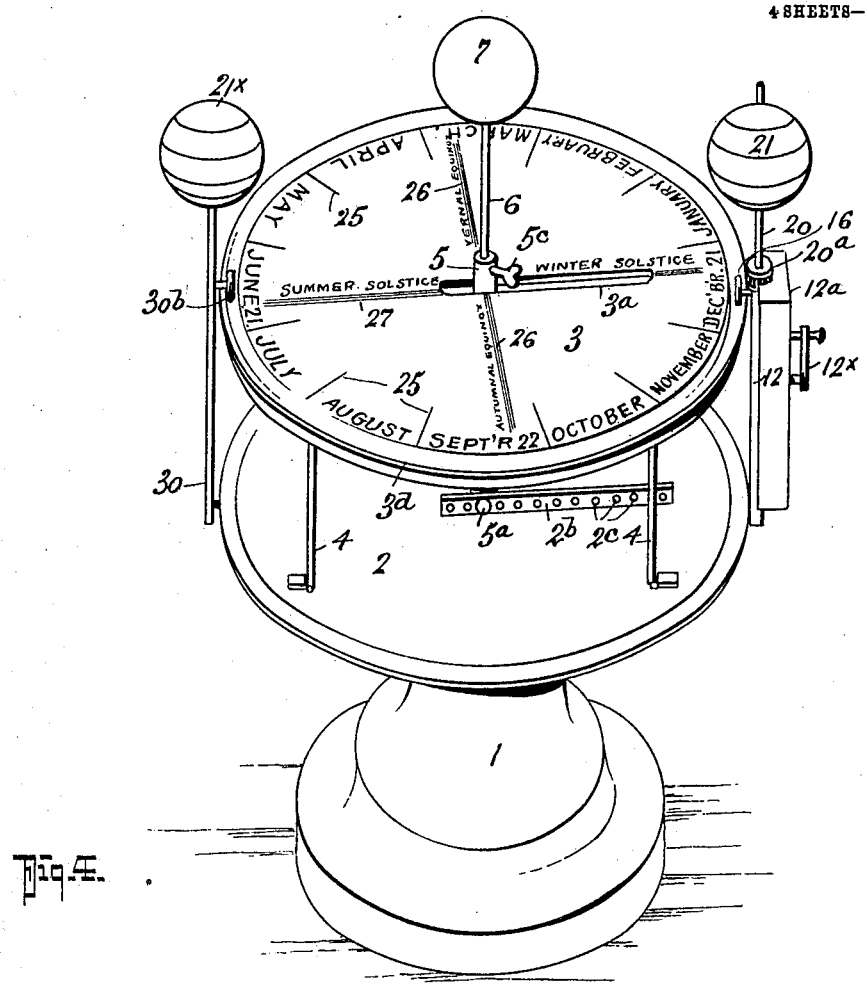

Figure 1, is a perspective view of my invention complete. Fig. 2, is a central vertical longitudinal section thereof. Fig. 3, is a perspective view of my invention arranged for illustrating one lesson. Fig. 4 shows my apparatus as used to illustrate another lesson. Fig. 5, is a central section showing the position of the parts illustrating another lesson. Figs. 6, 7 and 8, are detail views of the propelling mechanism for the " earth " carrier. Fig. 9, is an enlarged detail section of a portion thereof. Fig. 10, is a detail perspective view of the apparatus showing the " zone " marker in use. Fig. 11, is a detail view showing a cylinder containing a map of the world in Mercator's projection to illustrate certain facts. Fig. 12, is a detail view of a form of clamp used to secure the small globe to the shaft of the larger globe.

Referring now to the accompanying drawings, in which like letters and numerals of reference indicate like parts in all of the figures, 1 designates the base or support which carries the standard 5 that supports the central globe 7, which represents the "sun." Upon the base 1 is a disk or plate 2 which has movement in a horizontal plane and is provided with an elongated slot $2^a$ to permit passage of the standard 5 and the portion of the plate stamped or cut from the slot $2^a$ may be bent up to form a bar $2^b$ that is provided with apertures $2^c$ to permit passage of the set screw $5^a$ that secures the plate 2 in proper correlative position with relation to the standard 5.

Mounted on supports 4 over the plate 2 is a second plate 3 of like form to the plate 2 and likewise provided with a slot $3^a$ to permit passage of the standard 5 and with a bar portion $3^b$ that is apertured as at $3^c$ to receive the set screw $5^b$ that secures the plate 3 to the standard 5. The plates 2 and 3 are adjustable to move in parallelism by the supports 4 which are hinged to the plates 2 and 3 respectively by the hinge connections $4^a$—$4^b$ respectively. Each plate 2 and 3 is provided with a peripheral grooved runway $2^d$ and $3^d$ respectively to receive the support and drive wheels 15 and 16 and $30^a$ and $30^b$ of the planetary members hereinafter again referred to. The standard 5 is apertured to receive the spindle 6 that carries the "sun" globe 7, the spindle 6 being held in place by a set screw $5^c$ that is held by the standard 5.

8 designates a small globe to represent "Mercury" that is supported on an arm $8^a$ clamped by a clamp $8^b$ to the spindle 6. Another globe 9 to represent "Venus" is supported by an arm $9^a$ and clamped by a clamp $9^b$ to the spindle 6 of the "sun" globe 7, see Figs. 1 and 2 of the drawings.

12 designates a motor operated vehicle body which includes a housing $12^a$ in which the shafts 13—14 of the drive wheels 15 and 16 respectively are mounted, the shafts 13—14 being driven by a train of gears 18, from a spring motor 17 that may be wound up by a crank $12^x$, as shown in Figs. 6 to 9 inclusive. The body 12 receives the spindle 20 that supports the "earth" globe 21, the spindle 20 having a gear member $20^a$ that meshes with a gear 19 on the shaft 13, so that proper rotary motion may be imparted to the spindle 20 to turn the "earth" globe 21.

22 represents the "moon" globe which is supported on an arm $22^a$ that may be clamped at $22^b$ to the spindle 20 of the "earth" globe 21.

10 designates a flat bar apertured as at 10ᶜ to fit over the projecting end of the spindle 6 of the "sun" globe 7 and secured to said spindle through the medium of an arm 10ᵃ and a clamp 10ᵇ, the bar 10 having a slot 10ᵈ to receive the projecting end of the spindle 20 of the "earth" globe 21, as shown in Figs. 1 and 2 of the drawings. The bar 10 carries a crayon holder 11 to receive a crayon 11ˣ, for a purpose presently more fully to appear.

23 designates a second crayon holder carried by an arm 23ᵃ that is clamped by a clamp 23ᵇ to the bar 10. The crayon holder 23 is adapted to contain a pair of crayons 23ˣ, while holder 11 is adapted to contain a crayon 11ˣ to mark the zones of the "earth" globe.

When the crayons 23ˣ and 11ˣ are to be used for marking zones, a slate globe may be introduced on the carriage 12ᵃ otherwise an "earth" globe 21 having alternate red and blue bands to indicate the zones is used.

A second "earth" globe 21ˣ mounted on a standard 30 that has wheels 30ᵃ—30ᵇ to ride in the tracks 2ᵈ—3ᵈ respectively may be employed for demonstrating certain positions. For demonstrating other facts a cylinder 24 is introduced, in lieu of the "earth" globe 21, on which cylinder a map of the world in Mercator's projection is placed. The upper plate 3 has its upper surface divided by a series of radial lines 25 and spaces representing the months of the year and is divided by additional lines 26 and 27 that may be colored to distinguish them readily from the others, the line 26 designating the autumnal and vernal equinoxes, while the line 27 designates the summer and winter solstices.

In the practical uses of my apparatus the apparatus when placed in the position shown in Fig. 3 of the drawings may be used to show that there would be no change in seasons and that the days and nights would be of equal length all over the world, if the "earth" passed around the "sun" with its, (the "earth's") axis perpendicular to its orbital plane, with the "sun" in the plane of the "earth's" orbit.

When the apparatus is in the position shown in Fig. 4, it may be shown that the days and nights would be unequal everywhere on the "earth's" surface and that one of the "earth's" poles, would be in continual light, while the other is in continual darkness and still there would be no change in seasons, as can be readily illustrated by using a straight edge to define the zones.

By using the zone-markers 11 and 23 with the globes in the position shown in Figs. 5 and 10, the bar 10 will be carried around by the upper or "north" pole on a slated "earth" globe 21 to receive the crayons to show how the light or darkness creeps toward the poles as the season changes, while the "earth" moves around its orbit.

The "moon" globe 22 is moved around the "earth's" axis by hand to show the eclipses, by having the "moon" passed between the "sun" and "earth," thus eclipsing the "sun" and then by moving the "moon" globe with the "earth" between it and the "sun" to show how the "earth's" shadow is thrown on the "moon," causing an eclipse of the "moon." It should be understood that one-half of the "moon" globe 22 is colored red and the other blue, and by using the red side of the "moon" globe toward the "sun" and slowly moving it, it may be shown why we have the changes of the "moon."

In a similar manner the globes representing the planets "Venus" and "Mercury" may be moved to show why these stars are sometimes evening and sometimes morning stars.

With the complete apparatus, as shown in Fig. 1, all of the foregoing facts may be demonstrated and by having the "moon" and stars detachable, they may be removed and laid aside while certain lessons are being taught. By providing the motor operated body 12 to carry the "earth" around its orbit and rotate it on its axis, the action of the "earth's" movement may be rendered automatic.

It is obvious that numerous changes in the details of construction may be made without departing from the spirit of the invention or the scope of the appended claims, and from the foregoing decription, taken in connection with the accompanying drawings, it is thought the complete construction, operation and numerous advantages of my invention will be readily understood and appreciated by those skilled in the art to which the invention appertains.

What I claim is:—

1. An apparatus of the class described comprising a base, a relatively centrally located support projecting upwardly from said base, a pair of plates or disks having runways and being adjustably mounted over said base in different horizontal planes and penetrated by said central support, means for spacing said disks apart and holding them in parallelism, a globe mounted on the central support, combined with another support, wheels carried thereby to operate in said runways, and a "planet" body mounted on said last named support and means for adjusting said disks to vary the angle made between the wheeled support and the disks.

2. In an apparatus of the class described, a pair of horizontally mounted disks spaced apart and provided with peripheral tracks or runways, a centrally located globe body held above said disks, a carriage member, wheels carried thereby to run in said runways, a "planet" body supported by said carriage, and means for adjusting said disks in horizontal planes to adjust the angle between the carriage and the disks.

3. In an apparatus of the class described, a pair of horizontally supported disks having peripheral tracks or runways, means connecting said disks to be adjustable in parallelism, means for holding said disks in their adjusted positions, a spindle projecting through said disks, a globe body mounted on said spindle, a carriage having wheels to run in said runways and movable around said disks, together with a "planet" body supported by said carriage.

4. In an apparatus of the class described, a pair of horizontally supported disks having peripheral tracks or runways, means connecting said disks to be adjustable in parallelism, means for holding said disks in their adjusted positions, a spindle projecting through said disks, a globe body mounted on said spindle, a carriage having wheels to run in said runways and movable around said disks, together with a "planet" body supported by said carriage, supplemental "planet" bodies, and means for removably securing said supplemental "planet" bodies to the supports of said first mentioned and second mentioned "planet" bodies.

5. In an apparatus of the class described, a pair of parallelly supported spaced disks having peripheral runways and means for adjusting said disks in parallel horizontal planes together with a wheeled carriage whose wheels run in said runways, a "sun" body supported over said disks and a second "planet" body carried by said carriage, combined with means supported on said "sun" and "planet" bodies for marking zones on one of said bodies.

6. In an apparatus of the class described, a pair of parallelly supported spaced disks having peripheral runways and means for adjusting said disks in parallel horizontal planes together with a wheeled carriage whose wheels run in said runways, a "sun" body supported over said disks and a second "planet" body carried by said carriage, combined with means supported on said "sun" and "planet" bodies for marking zones on one of said bodies, said last named means comprising a bar held over and connected with said "sun" and "planet" bodies, and a zone marker carried by said bar to coöperate with one of said bodies.

7. In an apparatus of the class described, a pair of disks having runways adjustably mounted in horizontal planes, each having a peripheral grooved runway, a support projecting centrally through said disks, means for securing said disks to said support, a body carried by said support, a motor driven carriage having wheels to run in said runways, and be supported thereby, and a "planet" body supported by said carriage.

8. In an apparatus of the class described, a pair of disks having runways adjustably mounted in horizontal planes, each having a peripheral grooved runway, a support projecting centrally through said disks, means for securing said disks to said support, a body carried by said support, a motor driven carriage having wheels to run in said runways and be supported thereby, and a "planet" body supported by said carriage, the runway of one disk being located in the upper surface thereof and the runway in the other disk being located in the lower surface thereof.

9. In an apparatus of the class described, a pair of disks mounted in parallel horizontal planes and having runways, a support projecting centrally through said disks, a body carried by said support, a motor driven carriage having wheels to run in said runways, a "planet" body supported by said carriage, said motor carriage having provisions for rotating said "planet" body as the carriage moves around said disks, and means for marking zones on said last named "planet" body as it is rotated.

10. In an apparatus of the class described, a pair of parallel disks, means for supporting said disks in parallelism in different horizontal planes, means for holding said disks in their various adjustments, each of said disks having a peripheral runway, a motor vehicle carriage, said motor vehicle body including a drive motor, wheels to operate in said runways and geared with said drive motor, and a "planet" body supported by said motor vehicle carriage.

11. In an apparatus of the class described, a pair of parallel disks, means for supporting said disks in parallelism in different horizontal planes, means for holding said disks in their various adjustments, each of said disks having peripheral tracks or runways, a motor vehicle carriage, said motor vehicle body including a drive motor, wheels to operate in said runways and geared with said drive motor, a "planet" body supported by said motor vehicle carriage, and means connecting said "planet" body with said motor to rotate the "planet" body.

12. In an apparatus of the class described, a pair of parallel disks, means for supporting said disks in parallelism in different horizontal planes, means for holding said disks in their various adjustments, each of said disks having a peripheral runway, a motor vehicle carriage, said motor vehicle body including a drive motor, wheels to operate in said runways and geared with said drive motor, a "planet" body supported by said motor vehicle carriage, means connecting said "planet" body with said motor to rotate the "planet" body, together with a relatively centrally supported body mounted over said disks.

13. In an apparatus of the class described, a main base or support, a spindle projecting upwardly therefrom, a pair of horizontally disposed disks through which said spindle passes, means coöperating with said spindle and said disks for holding said disks in various adjustments, said disks being adjustable in their planes, a "sun" body supported on said spindle and a "planet" body supported on said disks to be movable around the periphery thereof.

14. In an apparatus of the class described, a main base or support, a spindle projecting upwardly therefrom, a pair of horizontally disposed disks through which said spindle passes, means coöperating with said spindle and said disks for holding said disks in their various adjustments, said disks being adjustable in their planes, a "sun" body supported on said spindle and a "planet" body supported on said disks to be movable around the periphery thereof, means supported by said "sun" and "planet" bodies for marking zones on said "planet" body as it rotates around said disk.

15. In an apparatus of the class described, a main base or support, a spindle projecting upwardly therefrom, a pair of horizontally disposed disks through which said spindle passes, means coöperating with said spindle and said disks for holding said disks in their various adjustments, said disks being adjustable in their planes, a "sun" body supported on said spindle and a "planet" body supported on said disks to be movable around the periphery thereof, means supported by said "sun" and "planet" bodies for marking zones on said "planet" body as it rotates around said disk, and supplemental "planet" bodies removably supported from said spindle adjacent to said "sun" body.

16. In an apparatus of the class described, a base or support, a disk horizontally mounted thereover, said disk having a slotted portion and an up-turned bar portion provided with adjusting apertures, a second disk supported over said first disk, said second disk also having a slot and apertured adjusting bar, a spindle mounted on said support and projecting through said slots, means coöperating with said adjustable bar and said spindle for holding said disks in their adjusted positions, means connecting said disks to move in parallelism, a "sun" body supported on said spindle over said second disk, and a "planet" body mounted on said disks to be movable around the periphery thereof.

17. In an apparatus of the class described, a pair of disks provided with peripheral runways, a motor vehicle body having wheels to run in said runways and supported from said disks, said motor vehicle body including a drive motor geared with said wheels, a "planet" body supported from said motor vehicle body to move therewith, means connecting said "planet" body with said drive motor to rotate the same as the motor vehicle body passes along said runway, together with a relatively fixed "sun" body supported over said disks, and means carried by said "sun" body and said "planet" body for marking zones on said "planet" body.

18. In an apparatus of the class described, a pair of disks spaced apart, means uniting said disks to move in parallelism, said disks being adjustable in their planes, a "sun" body relatively fixedly held over said disks, a "planet" body supported from said disks and movable around the periphery thereof, combined with a zone marker for marking the zones on said "planet" body as it is moved around the "sun" body.

19. In an apparatus of the class described, a pair of disks spaced apart, means uniting said disks to move in parallelism, said disks being adjustable in their planes, a "sun" body relatively fixedly held over said disks, a "planet" body supported from said disks and movable around the periphery thereof, combined with a zone marker for marking the zones on said "planet" body as it is moved around the "sun" body, said zone marker comprising a bar supported over said "sun" and "planet" bodies, a crayon carriage carried by said bar, a crayon mounted in said carriage to mark the polar zones and a second crayon carriage supported from said bar, said second crayon carriage having a crayon to mark intermediate zones.

WILLIE H. KELLER.

Witnesses:
L. L. WING,
J. B. GILBERT.